(12) United States Patent
Zhao et al.

(10) Patent No.: US 12,666,414 B2
(45) Date of Patent: Jun. 23, 2026

(54) FLEXIBLE SWITCHING BETWEEN STANDALONE MODE AND NON-STANDALONE MODE IN CARRIER AGGREGATION

(71) Applicant: Apple Inc., Cupertino, CA (US)

(72) Inventors: Xu Zhao, Edison, NJ (US); Xuan Guo, Glen Rock, NJ (US); Mohamed L. Haidara, New Providence, NJ (US)

(73) Assignee: Apple Inc., Cupertino, CA (US)

( * ) Notice: Subject to any disclaimer, the term of this patent is extended or adjusted under 35 U.S.C. 154(b) by 776 days.

(21) Appl. No.: 17/815,303

(22) Filed: Jul. 27, 2022

(65) Prior Publication Data

US 2024/0040557 A1     Feb. 1, 2024

(51) Int. Cl.
*H04W 72/12*          (2023.01)
(52) U.S. Cl.
CPC ................................... *H04W 72/12* (2013.01)

(58) Field of Classification Search
CPC ....................................................... H04W 72/12
See application file for complete search history.

(56) References Cited

U.S. PATENT DOCUMENTS

2014/0362780 A1* 12/2014 Malladi ............... H04W 72/542
                                                                      370/329
2016/0021661 A1*  1/2016 Yerramalli ........... H04B 17/309
                                                                      370/329

* cited by examiner

*Primary Examiner* — Brenda H Pham
(74) *Attorney, Agent, or Firm* — Fay Kaplun & Marcin, LLP

(57)          ABSTRACT

A user equipment (UE) is configured to operate in a non-standalone carrier aggregation (NSA CA) mode. The UE is also configured to determine an NSA CA bandwidth (BW) associated with bands being used for the NSA CA mode, determine a standalone carrier aggregation (SA CA) BW associated with bands being used for a SA CA mode after the UE is switched to the SA CA mode and determine, based on at least the NSA CA BW and the SA CA BW, for the UE to remain in the SA CA mode or switch to the NSA CA mode.

18 Claims, 4 Drawing Sheets

Network Arrangement 100

UE 110

Processor 205

RAT
Switching
Engine
235

Memory
Arrangement
210

Transceiver
225

Other
Components
230

Display Device
215

I/O Device
220 gNB
120A

Processor 305

Memory
Arrangement 310

Transceiver
325

I/O Device 320

Other Components
330

Flow 400

Table 480

| BWDiff Ratio 1 | BWDiff Ratio 2 | Potential Degradation Risk |
|---|---|---|
| High Ratio | High Ratio | High Risk |
| High Ratio | Low Ratio | Low Risk |
| Low Ratio | High Ratio | Low Risk |
| Low Ratio | Low Ratio | Low Risk |

FLEXIBLE SWITCHING BETWEEN STANDALONE MODE AND NON-STANDALONE MODE IN CARRIER AGGREGATION

BACKGROUND

With existing network and user equipment (UE) settings, a UE is prioritized to camp on Stand Alone Carrier Aggregation (SA CA) when both the UE and network can support SA CA. However, in view of evolving SA CA deployment, significant differences on both the downlink (DL) and uplink (UL) will exist between SA CA and Non-Standalone Carrier Aggregation (NSA CA). These bandwidth (BW) gaps will potentially cause significant user experience degradation.

SUMMARY

Some exemplary embodiments are related a processor of a user equipment (UE) operating in a non-standalone carrier aggregation (NSA CA) mode. The processor is configured to determine an NSA CA bandwidth (BW) associated with bands being used for the NSA CA mode, determine a standalone carrier aggregation (SA CA) BW associated with bands being used for a SA CA mode after the UE is switched to the SA CA mode and determine, based on at least the NSA CA BW and the SA CA BW, for the UE to remain in the SA CA mode or switch to the NSA CA mode.

Other exemplary embodiments are related to a user equipment (UE) having a transceiver configured to communicate using component carriers associated with a first network when operating in a standalone carrier aggregation (SA CA) mode and to communicate using component carriers associated with the first network and a second network when operating in a non-standalone carrier aggregation (NSA CA) mode. The UE also has a processor configured to determine an NSA CA bandwidth (BW) associated with bands being used for the NSA CA mode, determine an SA CA BW associated with bands being used for the SA CA mode and determine, based on at least the NSA CA BW and the SA CA BW, for the UE to operate in the SA CA mode or the NSA CA mode.

DETAILED DESCRIPTION

Figure 1:
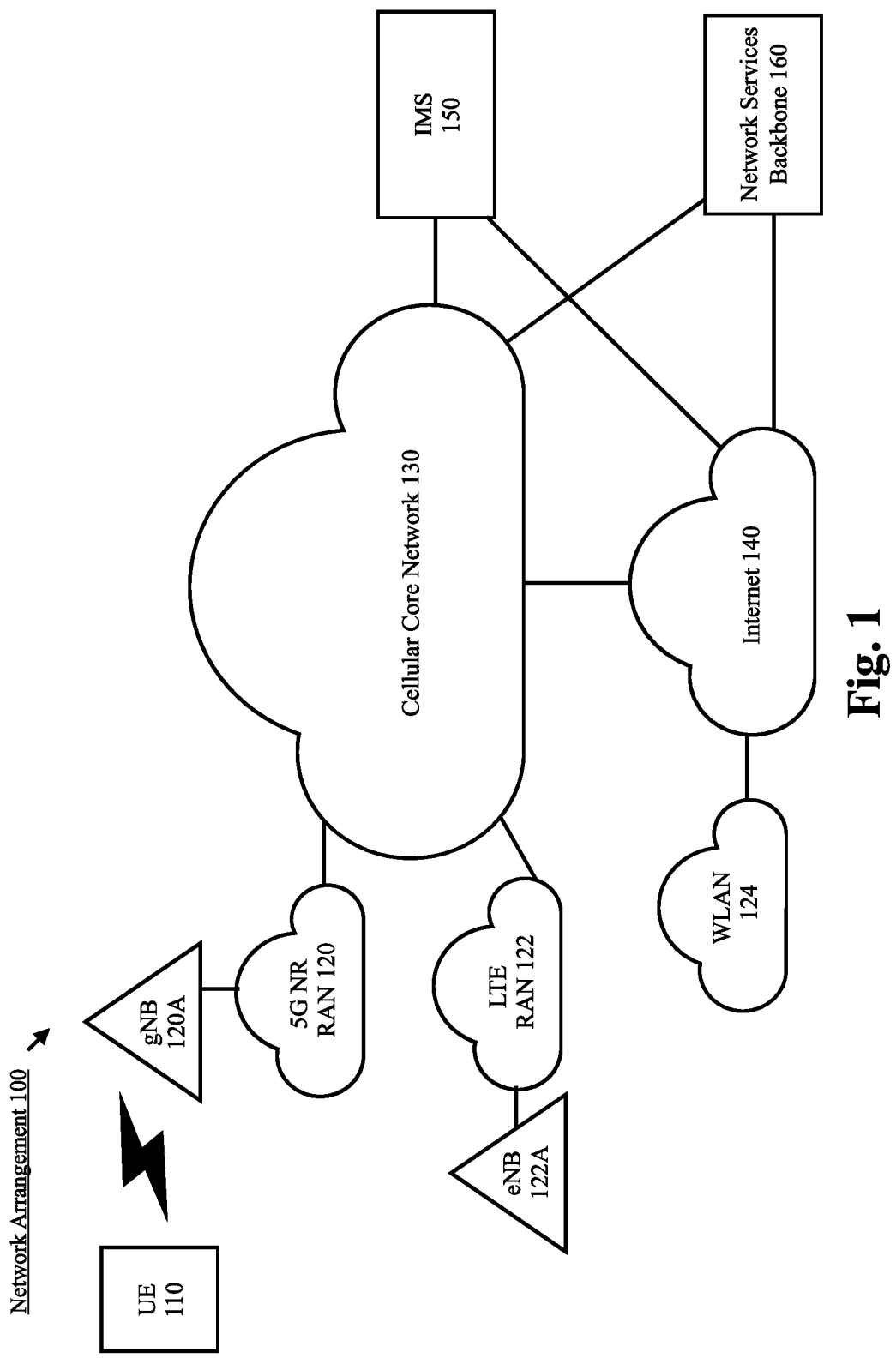
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to switching between Standalone (SA) Carrier Aggregation (CA) and Non-Standalone (NSA) CA modes of operation. The determination between SA CA and NSA CA may be based on an available bandwidth dynamic radio access technology (RAT) selection as will be described in greater detail below.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with reference to a 5G New Radio (NR) network and a Long Term Evolution (LTE) network. However, it should be understood that the exemplary embodiments may also be implemented in other types of networks, including but not limited to legacy networks, future evolutions of the cellular protocol (e.g., 6G networks), or any other type of network that supports SA and NSA modes of operation.

A UE may be configured to operate in non-standalone (NSA) mode or standalone (SA) mode. The exemplary embodiments are described with reference to the SA and NSA modes of 5G. However, as described above, other networks may support SA and NSA modes of operations and the exemplary embodiments may be applied to such networks. In NSA mode for 5G, the UE may establish a connection with both a 5G RAT and an LTE RAT. In SA mode for 5G, the UE may connect to one RAT at a particular time, e.g., the 5G RAT.

The network(s) and the UE may also support carrier aggregation (CA). CA relates to the UE being configured with a plurality of component carriers (CCs). Each CC may represent a channel that facilitates communication between the UE and the network over a particular frequency band. A plurality of CCs may correspond to the same frequency band, each CC may correspond to a different band or a combination thereof. Further, each CC has a particular bandwidth, and the more CCs the UE is configured with the more bandwidth that is available for communications with the network.

The CA functionality may comprise a primary serving cell (PCell) providing a primary component carrier (PCC) and at least one secondary serving cell (SCell) providing a secondary component carrier (SCC). The PCC may be used, in part, for control information such as scheduling requests, uplink grants, downlink grants, etc. CA functionality enables the PCC and at least one SCC to combine bandwidths to exchange data with the UE. Thus, with CA, the PCC may provide a first portion of a total bandwidth for data to be exchanged while the SCC may provide a second portion of the total bandwidth. The combination of a PCC and a single SCC may be characterized as a CC combination that includes two carriers. To further increase the total available bandwidth for data to be exchanged with the UE, additional SCCs may be incorporated. For example, with CA for LTE, there may be CC combinations that include, but are not limited to, two carriers, four carriers, five carriers, eight carriers, ten carriers, thirty-two carriers, etc. With CA for 5G NR there may be CC combinations that include, but are not limited to, two carriers, five carriers, ten carriers, twelve carriers, sixteen carriers, twenty carriers, twenty-five carriers, thirty-two carriers, sixty-four carriers, etc.

Thus, in SA CA mode, the 5G RAT will provide both the PCC and the SCC(s). While in NSA CA mode, the LTE RAT will provide LTE CC(s), which include PCC plus other LTE CC(s), and the 5G RAT will provide 5G NR CC(s). For the sake of simplicity in the description, it may be considered that the exemplary embodiments describe a NSA CA scenario where the PCC is provided by the LTE RAT and the other CC(s) are provided by the LTE RAT and the 5G RAT even though this is not a requirement of the exemplary embodiments. As described above, current network and UE settings prioritize the UE to camp on SA CA, when both the UE and the network are capable. However, there may be situations where it is more advantageous to operate in NSA CA mode even though the UE and the network are capable of operating in SA CA mode.

The exemplary embodiments provide a manner of selecting between SA CA and NSA CA modes based on one or more configurable parameters that consider the available bandwidth in both the SA CA and NSA CA modes. As will be described in greater detail below, these configurable parameters may be in the form of ratios of the available bandwidths. The exemplary parameters are used to determine whether there is a risk of degradation in the uplink (UL) or downlink (DL). The parameters may be used as inputs in a dynamic logic to make the selection. This dynamic logic may maintain the selection flexibility for future network adaptations.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120, an LTE RAN 122 and a wireless local area network (WLAN) 124. However, it should be understood that the UE 110 may also communicate with other types of networks (e.g., 5G cloud RAN, a next generation RAN (NG-RAN), a legacy cellular network, etc.) and the UE 110 may also communicate with networks over a wired connection. With regard to the exemplary embodiments, the UE 110 may establish a connection with the 5G NR RAN 120, the LTE RAN 122 and/or the WLAN 124. Therefore, the UE 110 may have a 5G NR chipset to communicate with the NR RAN 120, an LTE chipset to communicate with the LTE RAN 122 and an ISM chipset to communicate with the WLAN 124.

The 5G NR RAN 120 and the LTE RAN 122 may be portions of a cellular network that may be deployed by a network carrier (e.g., Verizon, AT&T, T-Mobile, etc.). The RANs 120, 122 may include cells or base stations that are configured to send and receive traffic from UEs that are equipped with the appropriate cellular chip set. In this example, the 5G NR RAN 120 includes the gNB 120A and the LTE RAN 122 includes the eNB 122A. However, reference to a gNB and an eNB is merely provided for illustrative purposes, any appropriate base station or cell may be deployed (e.g., Node Bs, eNodeBs, HeNBs, eNBs, gNBs, gNodeBs, macrocells, microcells, small cells, femtocells, etc.). The WLAN 124 may include any type of wireless local area network (WiFi, Hot Spot, IEEE 802.11x networks, etc.).

Those skilled in the art will understand that any association procedure may be performed for the UE 110 to connect to the 5G NR RAN 120. For example, as discussed above, the 5G NR RAN 120 may be associated with a particular network carrier where the UE 110 and/or the user thereof has a contract and credential information (e.g., stored on a Subscriber Identification Module (SIM) card). Upon detecting the presence of the 5G NR RAN 120, the UE 110 may transmit the corresponding credential information to associate with the 5G NR RAN 120. More specifically, the UE 110 may associate with a specific cell (e.g., the gNB 120A).

The network arrangement 100 also includes a cellular core network 130, the Internet 140, an IP Multimedia Subsystem (IMS) 150, and a network services backbone 160. The cellular core network 130 manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
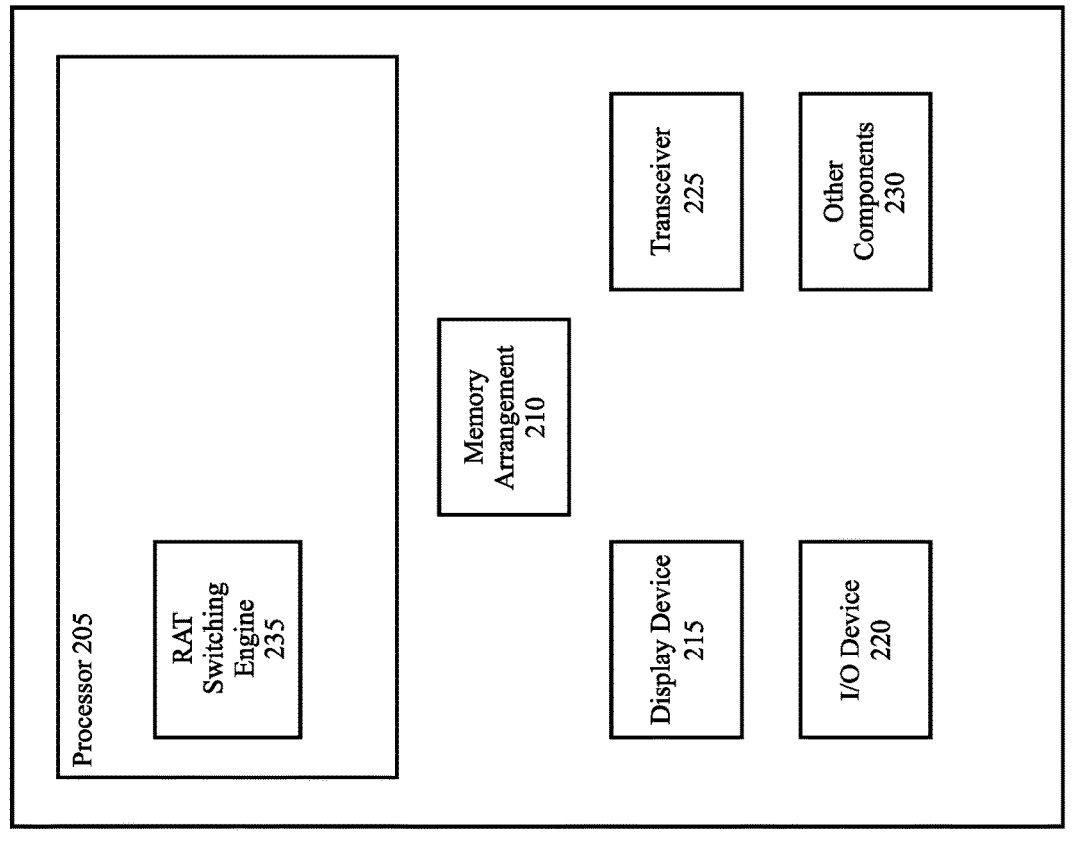
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc.

The processor 205 may be configured to execute a plurality of engines for the UE 110. For example, the engines may include a RAT switching engine 235 for performing operations related to selecting between SA CA and NSA CA modes using dynamic logic decisions based on the potential of performance degradation in either the UL or DL. These operations will be described in greater detail below.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies). For example, the transceiver 225 may operate on the unlicensed spectrum when e.g., NR-U is configured.

Figure 3:
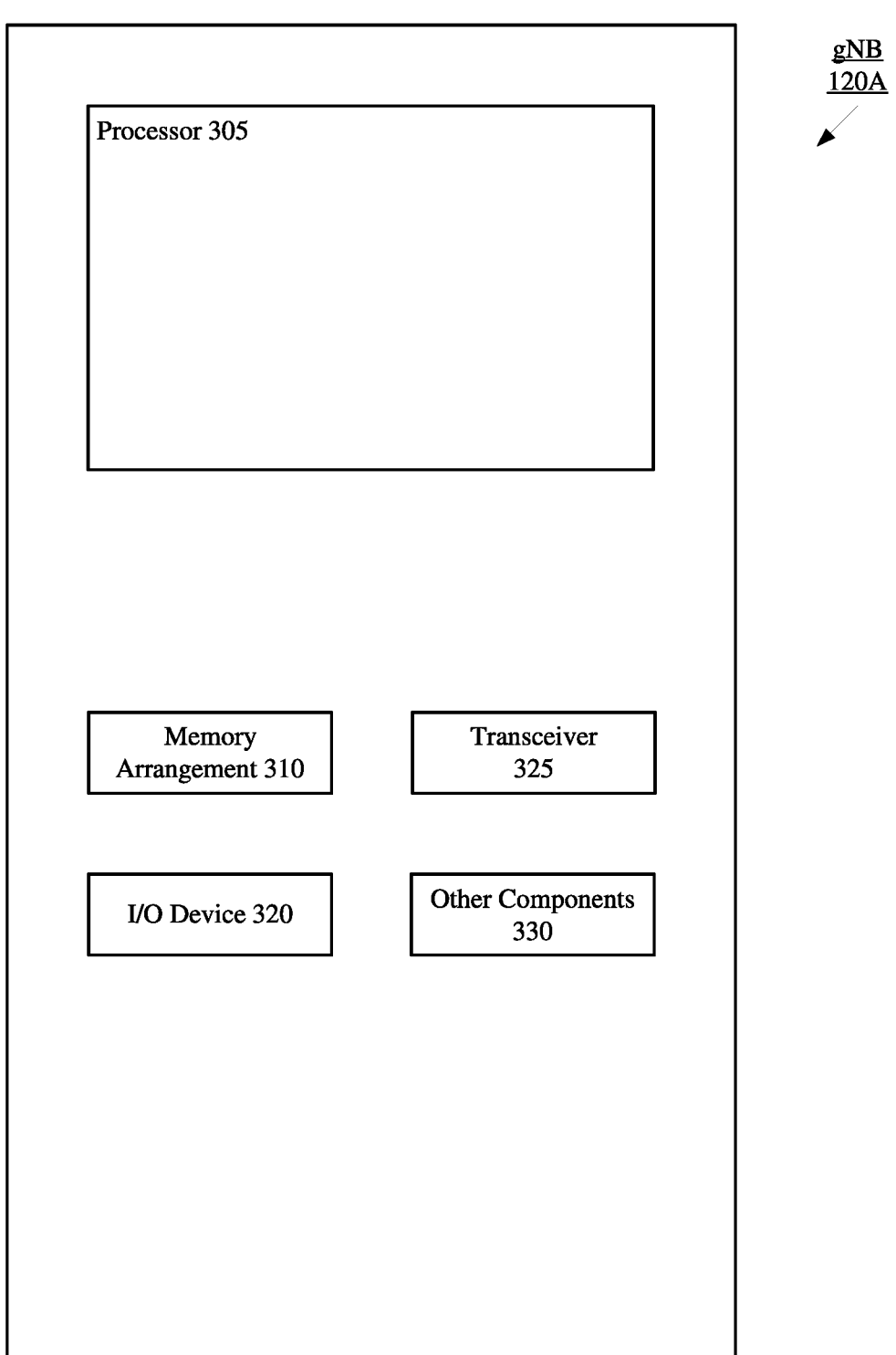
FIG. 3 shows an exemplary base station according to various exemplary embodiments.

FIG. 3 shows an exemplary base station 300 according to various exemplary embodiments. The base station 300 may represent the gNB 120A or any other access node through which the UE 110 may establish a connection and manage network operations.

The base station 300 may include a processor 305, a memory arrangement 310, an input/output (I/O) device 315, a transceiver 320 and other components 325. The other components 325 may include, for example, an audio input device, an audio output device, a battery, a data acquisition device, ports to electrically connect the base station 300 to other electronic devices and/or power sources, etc.

The processor 305 may be configured to execute a plurality of engines of the base station 300. For example, the engines may include a RAT switching engine 330. The RAT switching engine 330 may be configured to perform operations such as, but not limited to, redirecting the UE from NSA CA to SA CA or vice versa. These operations will be described in more detail below.

The above noted engine 330 being an application (e.g., a program) executed by the processor 305 is only exemplary. The functionality associated with the engine 330 may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 315 may be a hardware component or ports that enable a user to interact with the base station 300. The transceiver 320 may be a hardware component configured to exchange data with the UE 110 and any other UE in the network arrangement 100. The transceiver 320 may operate on a variety of different frequencies or channels (e.g., set of consecutive frequencies). Therefore, the transceiver 320 may include one or more components (e.g., radios) to enable the data exchange with the various networks and UEs.

As described above, existing network and UE settings prioritize camping on SA CA when both the UE and network support such capabilities. However, in certain scenarios, there may be a significant bandwidth difference in both the UL and DL between SA CA and NSA CA (favoring NSA CA). In bandwidth heavy applications and service scenarios, it may be desirable to utilize NSA CA rather than SA CA.

The exemplary embodiments provide a manner of selecting a preferred one of the SA CA mode or NSA CA mode based on bandwidth availability in the two modes. In the exemplary embodiments, the bandwidth availability is based on configurable parameters relating to available bandwidth in the SA CA mode and NSA mode. In some exemplary embodiments, the configurable parameters are ratios that include terms for the available bandwidth in the SA CA mode and NSA mode. In the exemplary embodiments, these ratios are referred to as BWDiff Ratio 1 and BW Diff Ratio 2. These ratios will be used as input into a RAT switching logic to be implemented by the UE 110. The RAT switching logic will determine whether a risk of UL and/or DL performance degradation in SA CA mode, described as Potential Degradation Risk (PDR) throughout this description. When the RAT switching logic of the UE 110 determines that there is a high PDR, the UE 110 may disable the SA CA capability causing the network to switch the UE 110 to NSA CA mode. As will be described in greater detail below, because the available bandwidth related parameters are configurable and because the RAT switching logic is flexible, the dynamic RAT switching described herein will maintain flexibility for future network adaptions instead of relying on hard transitions between SA CA and NSA CA.

The above mentioned bandwidth (BW) availability ratios may be defined as follows:

> BWDiff Ratio 1=Unique NSA CA BW/Shared BW between NSA CA and SA CA.

> BWDiff Ratio 2=Unique NSA CA BW/Unique SA CA BW.

The following provides an example of how the two ratios may be calculated by the UE 110. In this example, the following scenario may be considered. When the UE 110 is operating in SA CA mode, the PCC is 5G band n41 and the SCC is 5G band n71. When the UE 110 is operating in NSA mode, the PCC is LTE band b66 and the other CCs are LTE band b2 and 5G band n41. It may also be considered that that LTE band b66 has a BW of 20 MHz, LTE band b2 has a BW of 20 MHz, 5G band n41 has a BW of 60 MHz, and 5G band n71 has a BW of 10 MHz.

Based on the above examples, the values of the BWDiff Ratio 1 and BWDiff Ratio 2 may be determined as follows:

> BWDiff Ratio1=40 MHz($b$66+$b$2)/60 MHz($n$41)=2/3.

> BWDiff Ratio2=40 MHz($b$66+$b$2)/10 MHz($n$71)=4.

As will be described in greater detail below, these values of the BW availability ratios may be input into the RAT switching logic to determine whether SA CA or NSA CA mode should be used.

It should be understood that the above bands and available bandwidths are only exemplary and were provided to illustrate an example calculation of the BW availability ratios. These bandwidths and bands are not intended to limit the scope of the present disclosure to only these bandwidths or bands.

It should also be understood that the above described BW availability ratios are also only exemplary. As described above, the ratios are configurable and it may be considered that other parameters or other ratios using the same parameters may be used as input to the RAT switching logic. For example, through use of the RAT switching logic, it may be determined that a different parameter or a different ratio may be more indicative of the PDR. The exemplary embodiments are flexible to allow for the substitution of different parameters and/or ratios as input to the RAT switching logic.

Figure 4:
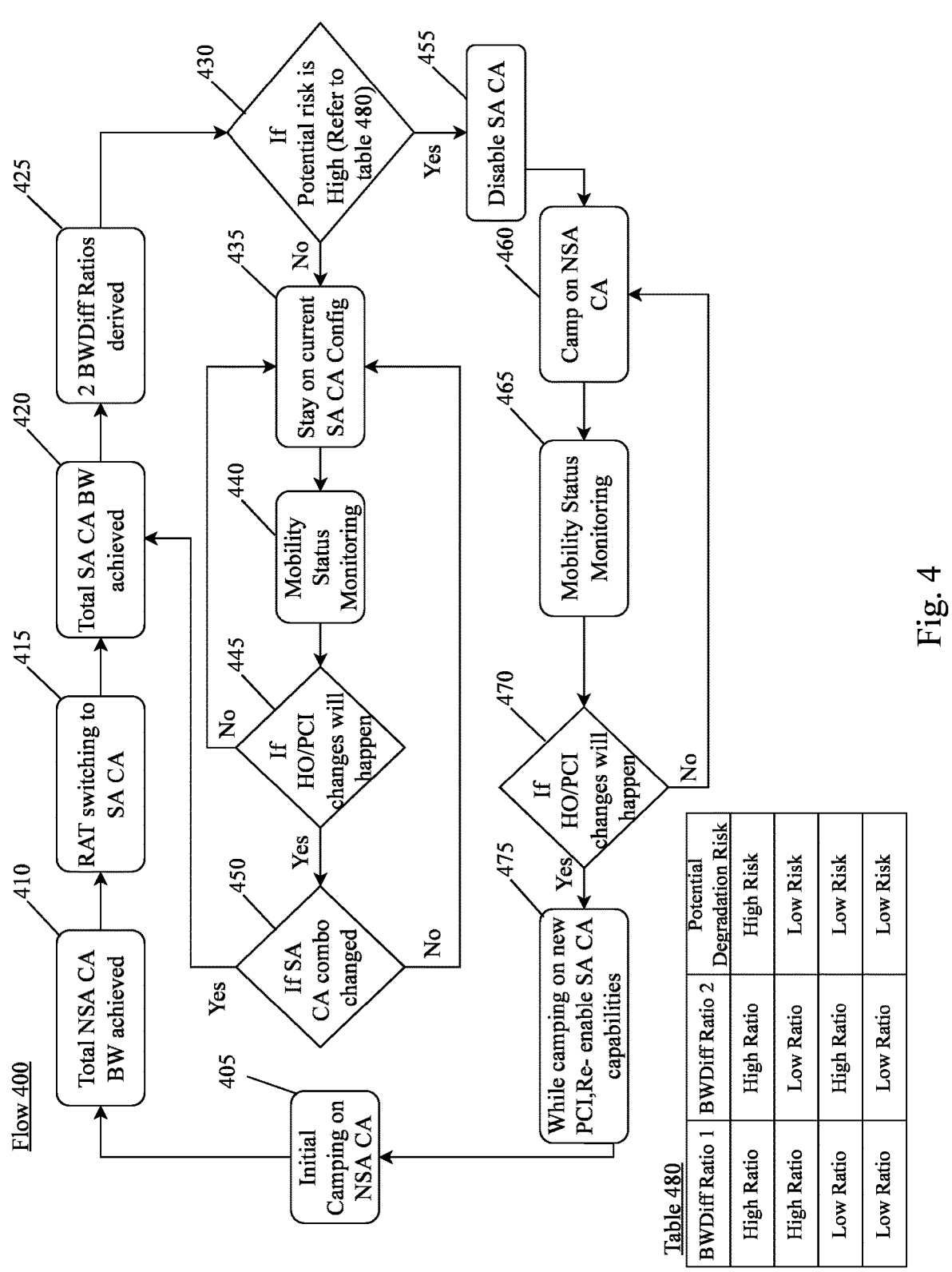
FIG. 4 shows an exemplary flowchart for a RAT switching logic according to various exemplary embodiments.

FIG. 4 shows an exemplary flowchart 400 for a RAT switching logic according to various exemplary embodiments. The flowchart will be described with reference to the SA and NSA example started above, e.g., in SA CA mode, the PCC is 5G band n41 and the SCC is 5G band n71 and in NSA mode, the PCC is LTE band b66 and the other CCs are LTE band b2 and 5G band n41.

At 405, the UE 110 is initially camped on NSA CA. At 410, the total NSA CA BW is achieved/determined. This may be in either the UL or DL. In the example, 5G band n41 has a BW of 60 MHz and LTE bands b66 and b2 each have a BW of 20 MHz. At this point, the UE 110 is aware of the values for the parameters associated with the BW availability ratios for NSA. For example, the numerator of the BW availability ratios (e.g., Unique NSA CA BW) is known.

At 415, the network (e.g., 5G NR-RAN 120 via gNB 120A) instructs the UE 110 to switch to SA CA. At 420, the total SA CA BW is achieved/determined. In the example started above, the PCC band n41 has a BW of 60 MHz and the SCC band n71 has a BW of 10 MHz. At this point, the UE 110 now has all the values for the parameters associated with the BW availability ratios. Thus, in 425, the UE 110 determines the BW availability ratios. The example calculations for the BWDiff Ratio 1=2/3 and the BWDiff Ratio 2=4 were performed above.

In 430, the UE 110 inputs the BW availability ratios into the RAT switching logic to determine whether to remain in SA CA mode or to return to NSA CA mode. An example of the RAT switching logic is shown in the table 480. The first column of the table 480 shows the values of the BWDiff Ratio 1. As shown in the table 480, the BWDiff Ratio 1 is shown as either being a high ratio or a low ratio. In some exemplary embodiments, a BWDiff Ratio 1 close to or higher than 0.5 can be defined as a high ratio. Thus, in the present example, the BWDiff Ratio 1=2/3 may be considered a high ratio. It should be understood that the example of defining a high BWDiff Ratio 1 as being higher than 0.5 is only exemplary and another threshold may be used.

The second column of the table 480 shows the values of the BWDiff Ratio 2. As shown in the table 480, the BWDiff Ratio 2 is also shown as either being a high ratio or a low ratio. In some exemplary embodiments, a BWDiff Ratio 2 close to or higher than 1.5 can be defined as a high ratio. Thus, in the present example, the BWDiff Ratio 2=4 may be considered a high ratio. It should be understood that the example of defining a high BWDiff Ratio 2 as being higher than 1.5 is only exemplary and another threshold may be used.

The third column of the table 480 shows the PDR corresponding to the different combinations of the BW availability ratios, e.g., whether there is a high risk of PDR or a low risk of PDR. As described above, the RAT switching logic is flexible. For example, the definition of the thresholds for the BW availability ratios may be changed. In another example, the combination of the BW availability ratios may be changed.

Thus, after inputting the BW availability ratios into the RAT switching logic, the UE 110 will determine if the PDR is high. If the PDR is high, meaning that there is a high risk of degradation in either the UL or DL, the UE 110 will decide to switch to back to NSA CA mode. In the example started above, the PDR is high and thus, the UE 110 in 430 will determine to return to the NSA CA mode.

This operation is shown in 455 where the UE 110 disables the SA CA capability. For example, the UE 110 may send a capability indication (e.g., an RRC message, a MAC-CE message, etc.) to the 5G NR-RAN 120 that the UE 110 does not support SA CA. Thus, the gNB 120A will instruct the UE 110 to camp on the NSA CA in 460.

In 465, the UE 110 monitors the mobility status while it is in the NSA CA mode. Those skilled in the art will understand that a change in mobility for the UE may change the PCC and/or SCC(s) in either the SA CA mode or the NSA CA mode. Thus, in 470, if there is no handover (HO) or Physical Cell ID (PCI) change, the UE 110 returns to 460 and remains camped on NSA CA 460 and continues to perform mobility status monitoring at 465.

However, if the UE 110 determines that HO/PCI changes are imminent, the UE 110 proceeds to 475 where the UE is camped on a new PCI. The UE 110 may then re-enable SA CA capabilities. As described above, the various configurations for SA CA (e.g., PCC, SCC and bandwidths) may be different when the UE 110 experiences a HO/PCI. The UE 110 then proceeds to 405, completing the cycle where the UE 110 is still camped on NSA CA at 405.

Turning back to 430, it may now be considered that the PDR is low, which again, may be determined based on the UE 110 inputting the BW availability ratio values into the RAT switching logic. Again, some examples of the combinations of BW availability ratios that result in a low PDR are shown in table 480. When the PDR is low, the UE 110, in 435, remains in current SA CA configuration.

In 440 and 445, the UE 110 performs the mobility status monitoring similar to the monitoring that was described above with reference to 465 and 470. If there are no HO/PCI changes, the method returns to 435, where the UE 110 stays on the current SA CA configuration and continues to perform mobility status monitoring 440 and 445.

If the UE 110 detects that HO/PCI changes will occur, the UE 110, in 450, will determine if the HO/PCI change resulted in a change in the SA CA band combination (e.g., has the PCC or SCC(s) changed). As described above, a change in PCI may cause the UE 110 to camp on a different SA CA band combination. If SA CA band combination has not changed, the method returns to 435, where the UE 110 stays on the current SA CA configuration and continues to perform mobility status monitoring 440 and 445

If SA CA band combination has changed, the values of the BW availability ratios may have changed. Thus, the method returns to 420 where the UE 110 checks the total achieved SA CA BW for the new SA CA band combination and proceed to recalculate the BW availability ratios in 425 before making the RAT switching decision in 430.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above-described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) operating in a non-standalone carrier aggregation (NSA CA) mode, the processor configured to:

determine an NSA CA bandwidth (BW) associated with bands being used for the NSA CA mode;

determine a standalone carrier aggregation (SA CA) BW associated with bands being used for a SA CA mode after the UE is switched to the SA CA mode; and determine whether the UE is to remain in the SA CA mode or switch to the NSA CA mode based on at least two ratios associated with the NSA CA BW and the SA CA BW.

2. The processor of claim 1, wherein a first ratio of the at least two ratios comprises a first bandwidth that is unique to the NSA CA BW and a second bandwidth that is shared between the NSA CA BW and the SA CA CW.

3. The processor of claim 1, wherein a second ratio of the at least two ratios comprises a first bandwidth that is unique to the NSA CA BW and a second bandwidth that is unique to the SA CA BW.

4. The processor of claim 1, wherein the determination is further based on a comparison of each of the at least two ratios to a corresponding threshold.

5. The processor of claim 4, wherein the processor is further configured to input results of the comparison of each of the at least two ratios to the corresponding threshold into a switching logic.

6. The processor of claim 1, wherein, when it is determined to switch to the NSA CA mode, the processor is further configured to:

disable a SA CA capability of the UE.

7. A user equipment (UE), comprising:

a transceiver configured to communicate using component carriers associated with a first network when operating in a standalone carrier aggregation (SA CA) mode and to communicate using component carriers associated with the first network and a second network when operating in a non-standalone carrier aggregation (NSA CA) mode; and a processor configured to:

determine an NSA CA bandwidth (BW) associated with bands being used for the NSA CA mode;

determine an SA CA BW associated with bands being used for the SA CA mode; and determine whether the UE is to operate in the SA CA mode or the NSA CA mode based on at least two ratios associated with the NSA CA BW and the SA CA BW.

8. The UE of claim 7, wherein a first ratio of the at least two ratios comprises a first bandwidth that is unique to the NSA CA BW and a second bandwidth that is shared between the NSA CA BW and the SA CA CW.

9. The UE of claim 7, wherein a second ratio of the at least two ratios comprises a first bandwidth that is unique to the NSA CA BW and a second bandwidth that is unique to the SA CA BW.

10. The UE of claim 7, wherein the determination is further based on a comparison of each of the at least two ratios to a corresponding threshold.

11. The UE of claim 10, wherein the processor is further configured to input results of the comparison of each of the at least two ratios to the corresponding threshold into a switching logic.

12. The UE of claim 7, wherein, when it is determined to operate in the NSA to:

disable a SA CA capability of the UE.

13. A method comprising:

at a user equipment (UE) operating in a non-standalone carrier aggregation (NSA CA) mode:

determining an NSA CA bandwidth (BW) associated with bands being used for the NSA CA mode;

determining a standalone carrier aggregation (SA CA) BW associated with bands being used for a SA CA mode after the UE is switched to the SA CA mode; and determining whether the UE is to remain in the SA CA mode or switch to the NSA CA mode based on at least two ratios associated with the NSA CA BW and the SA CA BW.

14. The method of claim 13, wherein a first ratio of the at least two ratios comprises a first bandwidth that is unique to the NSA CA BW.

15. The method of claim 14, wherein the first ratio of the at least two ratios further comprises a second bandwidth that is shared between the NSA CA BW and the SA CA CW.

16. The method of claim 13, wherein a second ratio of the at least two ratios comprises a first bandwidth that is unique to the NSA CA BW.

17. The method of claim 16, wherein the second ratio of the at least two ratios further comprises a second bandwidth that is unique to the SA CA BW.

18. The method of claim 13, wherein the determination is further based on a comparison of each of the at least two ratios to a corresponding threshold.

\* \* \* \* \*